United States Patent
Watanuki

(10) Patent No.: US 11,780,098 B2
(45) Date of Patent: Oct. 10, 2023

(54) ROBOT, ROBOT CONTROL METHOD, AND RECORDING MEDIUM

(71) Applicant: CASIO COMPUTER CO., LTD., Tokyo (JP)

(72) Inventor: Masatoshi Watanuki, Sagamihara (JP)

(73) Assignee: CASIO COMPUTER CO., LTD, Tokyo (JP)

( * ) Notice: Subject to any disclaimer, the term of this patent is extended or adjusted under 35 U.S.C. 154(b) by 0 days.

(21) Appl. No.: 17/952,677

(22) Filed: Sep. 26, 2022

(65) Prior Publication Data
US 2023/0016899 A1 Jan. 19, 2023

Related U.S. Application Data

(63) Continuation of application No. 16/447,613, filed on Jun. 20, 2019, now Pat. No. 11,485,021.

(30) Foreign Application Priority Data

Jun. 21, 2018 (JP) .................. 2018-117797

(51) Int. Cl.
*G06F 17/00* (2019.01)
*B25J 11/00* (2006.01)
*B25J 9/16* (2006.01)
*B25J 19/02* (2006.01)
*B25J 19/04* (2006.01)
(Continued)

(52) U.S. Cl.
CPC .............. *B25J 11/001* (2013.01); *B25J 9/163* (2013.01); *B25J 11/0015* (2013.01); *B25J 13/003* (2013.01); *B25J 19/023* (2013.01); *B25J 19/026* (2013.01); *B25J 19/04* (2013.01); *G06V 40/172* (2022.01)

(58) Field of Classification Search
CPC ...... B25J 11/001; B25J 9/163; B25J 11/0015; B25J 13/003; B25J 19/023; B25J 19/026; B25J 19/04; B25J 9/1602; B25J 9/1694; G06V 40/172; G06V 20/20
USPC .......................................................... 700/246
See application file for complete search history.

(56) References Cited

U.S. PATENT DOCUMENTS 10,130,232 B2 * 11/2018 Atchley ............... G05D 1/0289
10,286,558 B1 *  5/2019 Asada .................... B25J 13/003
(Continued)

FOREIGN PATENT DOCUMENTS

JP    2001-105363 A    4/2001
JP    2001-179665 A    7/2001
(Continued)

OTHER PUBLICATIONS

Multimodal Templates for Real-Time Detection of Texture-less Objects in Heavily Cluttered Scenes (Year: 2011).*
(Continued)

*Primary Examiner* — Ronnie M Mancho
(74) *Attorney, Agent, or Firm* — Fitch, Even, Tabin & Flannery LLP

(57) ABSTRACT

A robot is equipped with a processor. The processor detects external appearance or audio of a living being, and by controlling the robot, causes the robot to execute an operation in accordance with liking data indicating preferences of the robot regarding external appearance or audio and the detected external appearance or audio of the living being.

16 Claims, 8 Drawing Sheets

(51) Int. Cl.
*B25J 13/00* (2006.01)
*G06V 40/16* (2022.01)

(56) References Cited

U.S. PATENT DOCUMENTS

| | | | |
|---|---|---|---|
| 10,459,256 B2 * | 10/2019 | Fonte | H04N 23/611 |
| 10,471,591 B1 | 11/2019 | Hinkle | |
| 10,532,268 B2 * | 1/2020 | Tran | G06F 1/163 |
| 10,671,408 B1 * | 6/2020 | Colgrove | G06F 16/182 |
| 10,691,089 B2 * | 6/2020 | Ando | G05B 19/042 |
| 10,777,094 B1 * | 9/2020 | Rao | G06V 10/17 |
| 10,926,408 B1 | 2/2021 | Vogelsong et al. | |
| 10,929,661 B1 * | 2/2021 | Manyam | G06V 40/172 |
| 11,100,042 B2 * | 8/2021 | Bourgeois | G06F 3/0652 |
| 11,446,810 B1 * | 9/2022 | Chua | B25J 19/023 |
| 2004/0249510 A1 | 12/2004 | Hanson | |
| 2007/0192910 A1 | 8/2007 | Vu et al. | |
| 2013/0123987 A1 | 5/2013 | Kase et al. | |
| 2015/0314454 A1 | 11/2015 | Breazeal et al. | |
| 2017/0169203 A1 * | 6/2017 | Onodera | G10L 17/02 |
| 2017/0185276 A1 | 6/2017 | Lee et al. | |
| 2017/0282375 A1 | 10/2017 | Erhart et al. | |
| 2017/0282380 A1 * | 10/2017 | Uetabira | B25J 15/0009 |
| 2017/0352351 A1 | 12/2017 | Kimura | |
| 2017/0358201 A1 | 12/2017 | Govers et al. | |
| 2018/0181797 A1 | 6/2018 | Han et al. | |
| 2018/0231653 A1 | 8/2018 | Pradeep et al. | |
| 2018/0326589 A1 | 11/2018 | Grollman | |
| 2018/0336210 A1 * | 11/2018 | Bourgeois | G06F 3/0604 |
| 2019/0160683 A1 | 5/2019 | Hayashi | |
| 2019/0213438 A1 | 7/2019 | Jones et al. | |
| 2019/0250627 A1 | 8/2019 | Witt et al. | |
| 2020/0016745 A1 | 1/2020 | Tang et al. | |
| 2020/0094397 A1 | 3/2020 | Young et al. | |
| 2020/0311616 A1 | 10/2020 | Rajkumar et al. | |
| 2021/0049349 A1 | 2/2021 | Farokhi et al. | |
| 2021/0197393 A1 | 7/2021 | Mizukami et al. | |

FOREIGN PATENT DOCUMENTS

| | | |
|---|---|---|
| JP | 2004-066418 A | 3/2004 |
| JP | 2007-280417 A | 10/2007 |
| JP | 2012-519501 A | 8/2012 |
| JP | 2017-042883 A | 3/2017 |
| WO | 2017/175559 A1 | 10/2017 |

OTHER PUBLICATIONS

Vision-based place recognition: how low can you go? (Year: 2013).*
JPO; Application No. 2018-117797; Notice of Reasons for Refusal dated Aug. 23, 2022.
JPO; Application No. 2018-117797; Notice of Reasons for Refusal dated Apr. 5, 2022.
CNIPA; Application No. 201910537480.8; Notification of the First Office Action dated May 16, 2022.

* cited by examiner

FIG. 4

TARGET DATA 192

| ID | FACE IMAGE DATA | TYPE | SIMILARITY RATING | FAVORABILITY RATING |
|---|---|---|---|---|
| 001 | DATA A | OWNER | HIGH | 3 |
| 002 | DATA B | FAMILY MEMBER | HIGH | 3 |
| 003 | DATA C | ACQUAINTANCE | LOW | 0 |
| 004 | DATA D | UNKNOWN | INTERMEDIATE | 1 |
| ⋮ | ⋮ | | | |

FIG. 5

SCORE TABLE

| FACTOR | | FACTOR SCORE | | ADDED POINTS IN ACCORDANCE WITH TARGET | | | SCORE |
|---|---|---|---|---|---|---|---|
| | | | | TYPE | CONDITION | FAVORABILITY RATING | |
| PERIPHERAL ENVIRONMENT | SUDDEN SOUND | 15 | | | - | | 15 |
| | CHANGE (LARGE) | 13 | | | | | 13 |
| | HUMAN VOICE | 10 | | | | | 10 |
| | CHANGE (SMALL) | 8 | | | | | 8 |
| INTERNAL CONDITION | | 1~10 | | | - | | 1~10 |
| DETECTED TARGET | | 5 | | OWNER | 0~7 | 0~3 | 12~22 |
| | | | | FAMILY MEMBER 5 | | | 10~20 |
| | | | | ACQUAINTANCE 3 | | | 8~18 |
| | | | | UNKNOWN 1 | | | 6~16 |

193

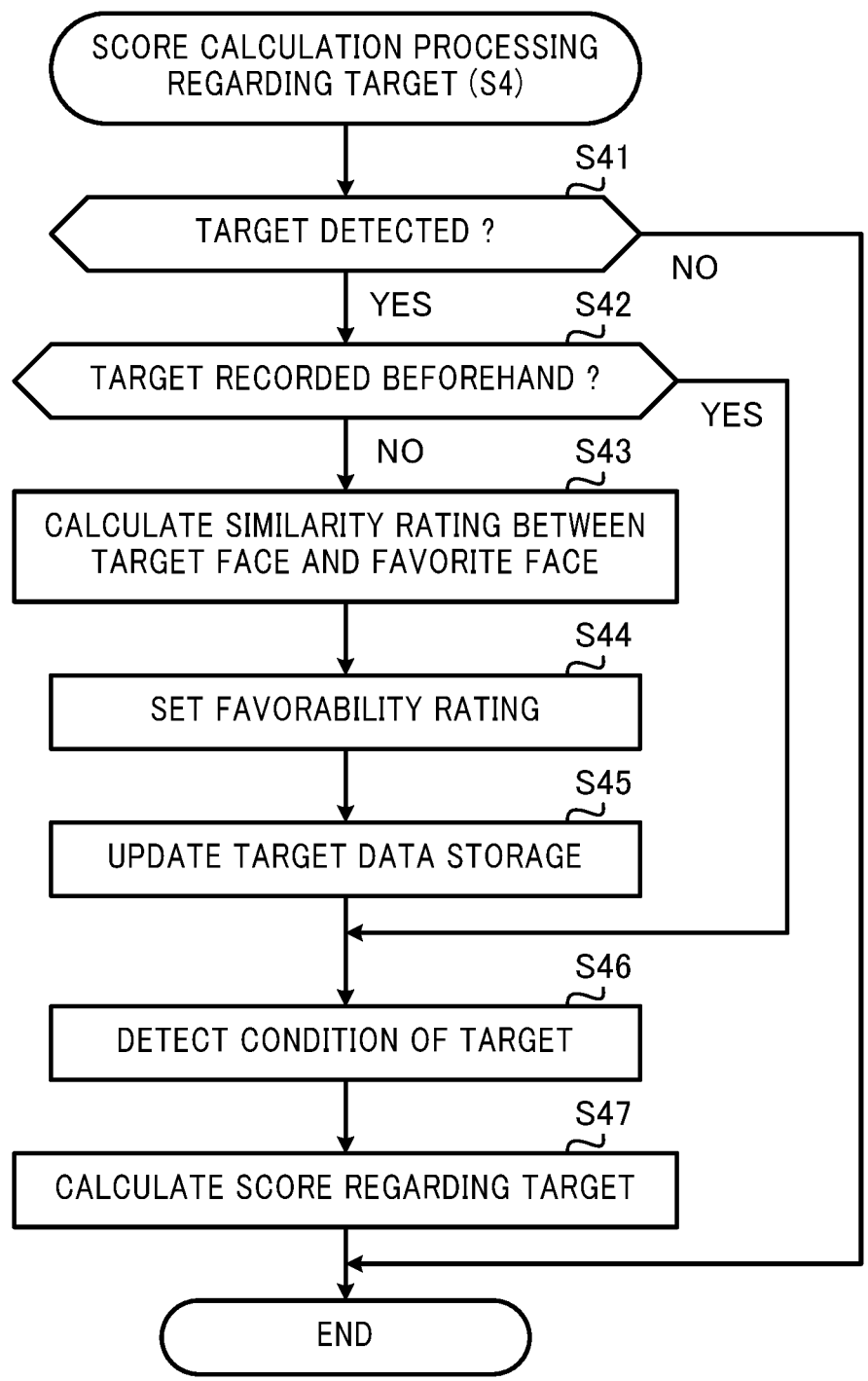

ROBOT, ROBOT CONTROL METHOD, AND RECORDING MEDIUM

CROSS-REFERENCE TO RELATED APPLICATIONS

This application is a continuation of U.S. patent application Ser. No. 16/447,613 filed Jun. 20, 2019, and claims the benefit of Japanese Patent Application No. 2018-117797, filed on Jun. 21, 2018, the entire disclosures of which are incorporated by reference herein.

FIELD

The present disclosure relates to a robot, a robot control method, and a recording medium.

BACKGROUND

Robots are known heretofore that performs an autonomous operation. For example, Unexamined Japanese Patent Application Kokai Publication No. 2007-280417 mentions a robot that recognizes an instruction to output a certain target and acts in accordance with the recognized instruction. Specifically, Unexamined Japanese Patent Application Kokai Publication No. 2007-280417 mentions the robot recognizing a face of the certain target, and on the basis of results of the facial recognition, prioritizing the instruction of the certain target among multiple targets.

SUMMARY

According to one aspect of the present disclosure, a robot includes a processor configured to detect external appearance or audio of a living being, and by controlling the robot, cause the robot to execute an operation in accordance with (i) liking data indicating preferences of the robot regarding external appearance or audio and (ii) the detected external appearance or audio of the living being.

According to another aspect of the present disclosure, control method of a robot includes detecting an external appearance or audio of a living being, and causing the robot to execute an operation in accordance with (i) liking data indicating preferences of the robot regarding external appearance or audio and (ii) the detected external appearance or audio of the living being.

According to yet another aspect of the present disclosure, a non-transitory computer-readable recording medium stores a program causing a computer of a robot to detect external appearance or audio of a living being; and cause the robot to execute an operation in accordance with (i) liking data indicating preferences of the robot regarding external appearance or audio and (ii) the detected external appearance or audio of the living being.

BRIEF DESCRIPTION OF THE DRAWINGS

A more complete understanding of this application can be obtained when the following detailed description is considered in conjunction with the following drawings, in which:

FIG. 4 is a drawing illustrating an example of favorability rating data stored in the robot according to the embodiment of the present disclosure;

FIG. 5 is a drawing illustrating an example of a score table stored in the robot according to the embodiment of the present disclosure;

FIG. 9 is a flowchart illustrating score calculation processing regarding a detected target executed by the robot according to the embodiment of the present disclosure.

DETAILED DESCRIPTION

An embodiment of the present disclosure is described below with reference to drawings. Within the drawings, parts that are identical or equivalent are assigned the same reference symbol.

Figure 1:
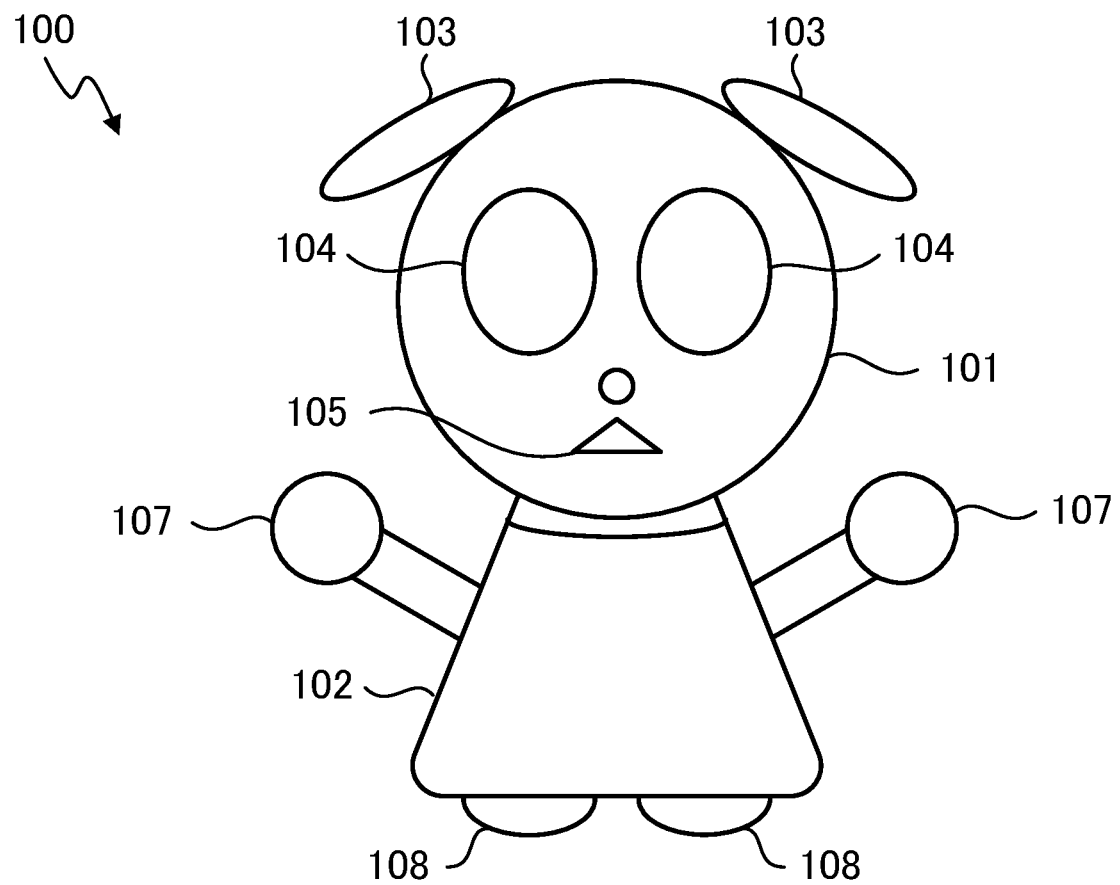
FIG. 1 illustrates external appearance of a robot according to an embodiment of the present disclosure.

FIG. 1 illustrates external appearance of a robot 100 according to the embodiment of the present disclosure. The robot 100 has the shape of an animal (pet) and is a device that performs an autonomous operation in accordance with a prescribed operation program.

The robot 100 performs various operations in accordance with stimuli from the outside such as being hailed, touched, or the like by a certain target present at the exterior of the robot 100. Therefore, the robot 100 can perform communication with the certain target and can have interaction with the certain target.

The "certain target" is a target present at the exterior of the robot 100 and serves as a partner that performs communication and interaction with the robot 100. Specific examples of the certain target include a user (owner, family member, acquaintance, or the like of the robot 100) who is a person in the surroundings of the robot 100, an animal (such as a pet kept by the user), and another robot other than the robot 100. The certain target may also be termed a "communication target", a "communication partner", an "interaction target", an "interaction partner", or the like. Hereinafter, the "certain target" is also simply termed the "target".

Furthermore, the animal serving as the certain target is not limited to a pet serving as the interaction partner of the robot 100, and may include animals that are possibly present in the surroundings of the robot 100, such as insects, spiders, centipedes, snakes, or the like. In the case in which the certain target is a human being or an animal, the certain target is termed a "living being". That is to say, the "living being" indicates a scope of the certain targets that excludes another robot.

As illustrated in FIG. 1, the robot 100 has a three-dimensional shape that has the external appearance of a dog. In the manufacture of the robot 100, the main material is a hard-synthetic resin such as a plastic, for example. The robot 100 includes a head 101, a torso 102, ears 103, eyes 104, a mouth 105, paws 107, and legs 108.

The head 101, the ears 103, the paws 107, and the legs 108 are parts capable of being moved by drive components internal to the robot 100. The head 101 is attached to the torso 102 by joints of the neck arranged at the neck so as to be capable of rotation in the three directions of pitch, roll, and yaw. A display 117 that displays a graphic (such as an eyeball) regarding the eye is arranged in the eye 104. An imager 115a for imaging in front of the robot 100 is arranged in the mouth 105.

Figure 2:
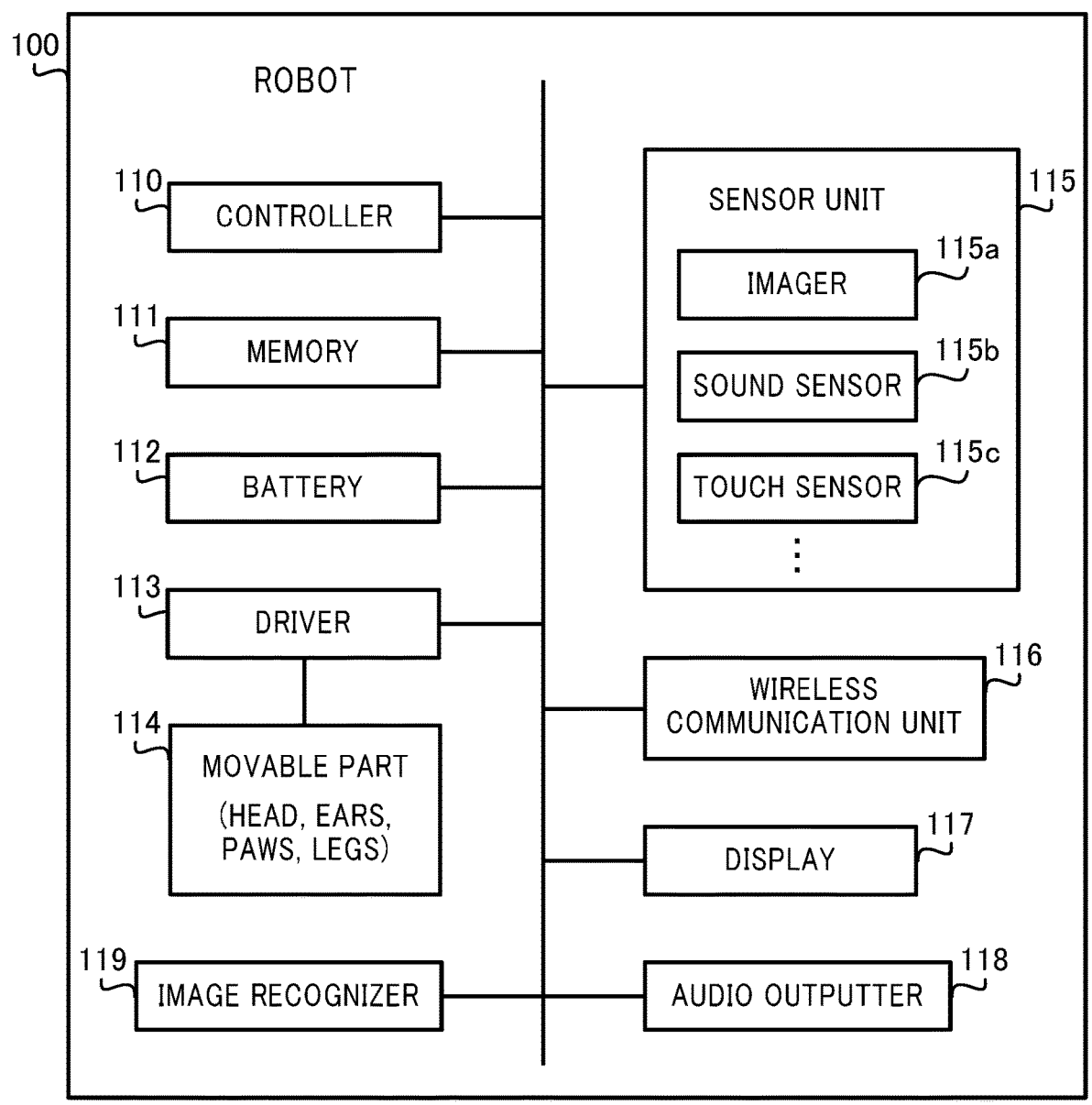
FIG. 2 is a block diagram illustrating hardware configuration of the robot according to the embodiment of the present disclosure.

FIG. 2 illustrates hardware configuration of the robot 100. As illustrated in FIG. 2, the robot 100 includes a controller 110, a storage 111, a battery 112, a driver 113, a movable part 114, a sensor unit 115, a wireless communication unit 116, a display 117, an audio outputter 118, and an image recognizer 119.

The controller 110 includes a central processing unit (CPU), a read only memory (ROM), and a random-access memory (RAM). The CPU, for example, is a processor such as a microprocessor, and is a central calculation processing unit that executes various types of processing and calculations. In the controller 110, the CPU reads a control program stored in the ROM and controls overall operations of the robot 100 while using the RAM as working memory.

The storage 111 is non-volatile memory such as a flash memory, a hard disk, or the like. The storage 111 stores programs and data, including an operating system (OS) and application programs, for use by the controller 110 to perform various types of processing. Moreover, the storage 111 stores data generated or acquired by the controller 110 performing the various types of processing.

The battery 112 is a storage battery that stores electrical energy and supplies power to each part of the robot 100. When the robot 100 is connected to a charge station, the battery 112 is charged by the charge station.

The driver 113 includes drive components such as motors, actuators, or the like for causing driving of the robot 100, and a drive circuit for driving such drive components. Specifically, the drive components include a drive actuator for driving the movable part 114 of the robot 100, and a locomotion actuator for causing locomotion of the robot 100. The movable part 114 is a part that is movable, and specific examples are the head 101, the ears 103, the paws 107, and the legs 108. On the basis of an operation program, the controller 110 transmits a control signal to the drive circuit. The drive circuit provides a pulse signal for driving to the drive component in accordance with the control signal transmitted from the controller 110. The drive component drives the movable part 114 in accordance with the pulse signal supplied from the drive circuit.

Due to the driver 113 driving the movable part 114, the robot 100 can perform various types of operations. For example, by moving the legs 108, the robot 100 can perform locomotion forward or backward, and can change direction of the robot 100. Wheels are arranged on the legs 108, and by the driver 113 driving rotation of the wheels, the robot 100 position or direction may be changed. Moreover, by movement of the head 101 or the paws 107, the robot 100 can imitate a human action or human behavior.

Multiple sensors, as the sensor unit 115, are provided for sensing physical quantities of the surroundings or interior of the robot 100. As illustrated in FIG. 2, the sensor unit 115 includes the imager 115a that images the surroundings, a sound sensor 115b that senses sound, and a touch sensor 115c that senses touching of the robot 100. Moreover, the sensor unit 115 also includes non-illustrated sensors such as a distance sensor that measures distance from the robot 100 to an object in the surroundings, an acceleration sensor that senses movement of the robot 100, a gyro sensor that senses rotation of the robot 100, a geomagnetism sensor that senses bearing of the robot 100, a temperature sensor that measures temperature of the surroundings of the robot 100, and an air pressure sensor that senses air pressure of the surroundings of the robot 100.

The imager 115a is a so-called camera and is installed in the mouth 105. The imager 115a includes an image acquirer that collects light emitted from an imaged object and acquires an image of the imaged object, and an image processor that processes the image acquired by the image acquirer. The sound sensor 115b is arranged on the head 101 and senses a voice of the user, environmental sound of the surroundings, or the like. The robot 100 is equipped with multiple microphones, as the sound sensor unit 115b, so as to surround the head 101, and can efficiently sense sounds generated from all directions.

The touch sensor unit 115c is arranged at various locations on the robot 100 and detect a position of touch when the surface of the robot 100 is touched by the user. Other sensors are arranged at various locations of the robot 100 and acquire information indicating internal or surrounding conditions of the robot 100. Due to such multiple sensors, the sensor unit 115 acquires information indicating the internal or surrounding conditions of the robot 100, and supplies the acquired information to the controller 110.

The wireless communication unit 116 is equipped with an interface for wireless communication with external equipment. Under control of the controller 110 and in accordance with a communication specification such as wireless fidelity (Wi-Fi) or the like wireless local area network (LAN), Bluetooth (registered trademark), near field communication (NFC), or the like, the wireless communication unit 116 performs wireless communication with external equipment such as the charge station for charging the robot 100, a cloud server, or the like.

The display 117 is a display device such as a liquid crystal display, an organo-electro-luminescence (EL) display, a light emitting diode (LED), or the like. The display 117 is arranged at an eyeball part of the eye 104, and under control by a non-illustrated display drive circuit, displays various graphics in accordance with conditions.

The audio outputter 118 is equipped with an audio speaker and an audio output interface, converts audio data generated by the controller 110 to audio, and outputs the converted audio to the exterior. The audio speaker is arranged in the head 101. The audio outputter 118 outputs various types of audio including animal vocalizations and human words. For example, the robot 100 uses the sound sensor 115b to collect audio of the user, and outputs from the audio speaker of the audio outputter 118 audio corresponding to content of audio of the user. Simple conversation with the user is possible due to such operation.

The image recognizer 119 is equipped with an image-processing processor such as a digital signal processor (DSP) and a graphics processing unit (GPU), and a buffer memory that temporarily saves the processed image, and recognizes the image obtained by imaging by the imager 115a. The image recognizer 119 uses widely-known image recognition techniques to recognize a person, face, object, pattern, or the like included in the image obtained by imaging by the imager 115a.

Figure 3:
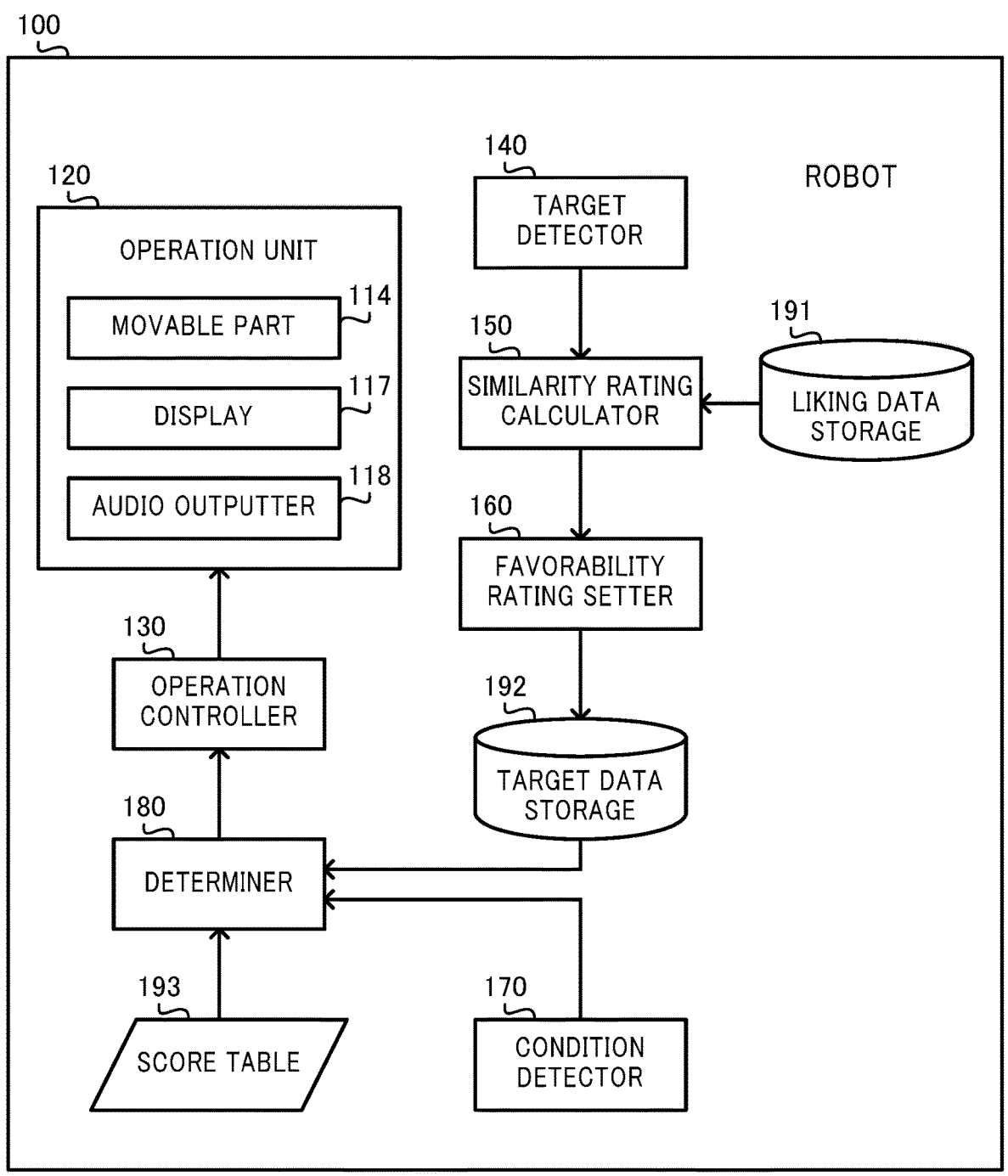
FIG. 3 is a block diagram illustrating functional configuration of the robot according to the embodiment of the present disclosure.

Next, functional configuration of the robot 100 is described with reference to FIG. 3. As illustrated in FIG. 3, the robot 100 is functionally equipped with an operation unit 120, an operation controller 130, a target detector 140, a similarity rating calculator 150, a favorability rating setter 160, a condition detector 170, and a determiner 180. Each of the components that are the operation controller 130, the target detector 140, the similarity rating calculator 150, the favorability rating setter 160, the condition detector 170, and the determiner 180 function under control by the CPU in the controller 110 reading programs stored in the ROM, outputting the read programs to the RAM, and executing the read programs.

Moreover, the robot 100 is equipped with a liking data storage 191 and a target data storage 192. These components are constructed from suitable memory regions of the storage 111.

The operation unit 120 is a part that causes the robot 100 to perform an operation. As illustrated in FIG. 3, the operation unit 120 includes the movable part 114, the display 117, and the audio outputter 118.

The operation controller 130 controls the operation unit 120 and causes the robot 100 to execute various types of prescribed operations. For example, the operation controller 130 uses the drive actuator to cause movement of the head 101, the ears 103, the paws 107, and the legs 108 arranged as a movable part 114, thereby changing the position, orientation, attitude, or posture of the robot 100. The operation controller 130 causes locomotion of the robot 100 by using the locomotion actuators to cause front-back and right-left movement of the legs 108, or by causing rotation of the wheels arranged on the legs 108. Moreover, the operation controller 130 displays on the display 117 an image indicating an expression of the face of the robot 100. Furthermore, the operation controller 130 converses with the user by output of audio from the audio speaker of the audio outputter 118. The operation controller 130 causes the robot 100 to execute various types of operations in this manner. The operation controller 130 is achieved by the controller 110 in cooperation with the driver 113.

The liking data storage 191 stores liking data. The liking data is data retained to define individuality of the robot 100, and specifically is data indicating preferences of the robot 100 regarding external appearance. The robot 100 acts favorably with respect to a target having a favorite external appearance, and does not act favorably with respect to a target that does not have the favorite external appearance. In this manner, preferences of the robot 100 regarding external appearance affect the operations of the robot 100.

Here, the "external appearance" indicated by the liking data is specifically the face of a human, animal, another robot, or the like that is the certain target. The liking data storage 191 stores as liking data at least one image indicating the pattern of the face, which is a favorite of the robot 100. The face indicated by the liking data may be the face of an actual human or may be the face of a virtual human created by means such as computer graphics (CG). Moreover, the face indicated by the liking data may be the face of a non-human animal, as long as a below-described similarity rating calculator 150 can calculate a similarity rating by pattern comparison with the face of the target. Furthermore, if comparison with a face is possible, the liking data may indicate a non-facial image, such as the pattern of a general shape, decorative pattern, or the like.

The liking data is data unique to the robot 100, and is stored in the liking data storage 191 so that the user is unable to freely performing setting, revising, and deleting of such data. Specifically, the liking data is stored in the liking data storage 191 prior to shipping of the robot 100. Here, the term "shipping" means for the robot 100 to go on the market from a factory, warehouse, or the like after manufacture at a site such as the factory. For example, when the robot 100 is manufactured at the factory, the liking data of the liking data storage 191 may be written beforehand to a liking data storage region such that, when the shipped robot 100 arrives at the location of the user, the data can be read but cannot be rewritten. By setting the liking data in this manner prior to shipping, the robot 100 can be made to have innate individuality as if to have the facial preferences innate to humans.

The favorite face of the robot 100 indicated by the liking data stored in the liking data storage 191 is different from another favorite face, of another robot of the same model type as the robot 100, indicated by other liking data stored in the other robot. The "other robot of the same model type as the robot 100" is a robot that has the same external appearance as that of the robot 100 and acts on the basis of the same operation algorithms. For expression of individuality of the robot 100, the favorite face of the robot 100 is set per unit to be mutually different among multiple robots, even when the model type is the same. For example, during the manufacture of multiple robots of the same model type, liking data indicating a mutually different favorite face is stored in the liking data storage 191 of each of the robots. Therefore, conditions are established by which the favorite face of a given robot is not the favorite face of the other robot of the same model type.

Here, the favorite face indicated by the liking data stored in each of the robots of the same model type may differ for all of the robots, or may be duplicated for some of the robots. However, by setting such that the favorite faces different among as many robots as possible, the robots can be imparted with diverse individuality. The liking data is stored in the liking data storage region of the liking data storage 191, which is different from a target data storage region of the below-described target data storage 192. Users, including the owner, cannot update and delete the liking data stored in the liking data storage 191.

The target detector 140 detects the face of the target present in the surroundings of the robot 100. Specifically, by imaging of the surroundings by the imager 115a, the target detector 140 acquires an image indicating appearance of the surroundings. Then in the case in which the face of a human, animal, other robot, or the like that is the certain target is included in the acquired image, the target detector 140 detects the face by the functions of the image recognizer 119.

In this manner, in the case in which the target is present in the surroundings of the robot 100, the target detector 140 can detect the presence of the target by detecting the face. Further, in the case in which multiple targets are present in the surroundings of the robot 100, the target detector 140 can detect the face of each of the targets. The target detector 140 is achieved by the controller 110 in cooperation with the imager 115a and the image recognizer 119.

The similarity rating calculator 150 calculates the similarity rating between the face of the target detected by the target detector 140 and the favorite face of the robot 100 indicated by the liking data stored in the liking data storage 191. Here, the term "similarity rating" is an indicator indicating a degree to which two faces resemble each other. The similarity rating calculator 150 compares the pattern of the face of the target detected by the target detector 140 and the pattern of the favorite face of the robot 100 indicated by the liking data stored in the liking data storage 191. Then the similarity rating calculator 150, on the basis of predetermined rules, determines whether the patterns of the two faces resemble each other Specifically, by use of the functions of the image recognizer 119, from the image acquired by the imager 115a, the similarity rating calculator 150 recognizes the outline of the target face and parts such as the eyes, ears, nose, mouth, or the like included in the face. Then the similarity rating calculator 150, compares the outline shape and/or the positions and shapes of each of the parts with the face indicated by the liking data, and calculates a value, as the similarity rating, that increases with degree of matching. The similarity rating calculator 150 is achieved by the controller 110 in cooperation with the image recognizer 119.

Further, in the case in which the face of the target is not imaged by the imager 115a from the front, the orientation of the face of the target in the acquired image may differ from the orientation of the face indicated by the liking data. In this case, the similarity rating calculator 150 calculates the similarity rating after performing a data conversion to correct the orientation of the face for the acquired image so that the orientation of the face of the target in the acquired image approaches the orientation of the face indicated by the liking data. By absorbing differences in the orientation of the face in this manner, the similarity rating calculator 150 can calculated the similarity rating of the two faces with good accuracy.

The favorability rating setter 160, on the basis of the similarity rating calculated by the similarity rating calculator 150, sets the favorability rating of the robot 100 with respect to the target. Here, the "favorability rating" is an indicator indicating the degree of favorable emotion of the robot 100 for the target. The higher the favorability rating of the robot 100 with respect to the target, the greater the execution of the favorable operation or priority operation with respect to the target; and the lower the favorability of the target, the less the execution of the favorable operation or priority operation with respect to the target. In other words, the operation controller 130 changes the degree of the favorable operation and the priority operation relative to the target in accordance with the favorability rating with respect to the target.

Specifically, the higher the similarity rating between the favorite face and the target face calculated by the similarity rating calculator 150, the higher the favorability rating setter 160 sets the favorability rating of the robot 100 with respect to the target. A higher similarity rating calculated by the similarity rating calculator 150 means that the target face is more similar to the face that is innately favorite per the individuality of the robot 100. Therefore, the favorability rating setter 160 sets a higher favorability rating with respect to the target having a face having a higher similarity rating with the favorite face of the robot 100, such that the robot 100 further performs the favorable operation or the priority operation.

Upon setting of the favorability rating in this manner, the favorability rating setter 160 causes the set favorability rating to be stored in the target data storage 192. The favorability rating setter 160 is achieved by the controller 110 in cooperation with the storage 111.

The target data storage 192 stores in the target data storage region the target data regarding the targets serving as each interaction partner with respect to the robot 100. The target data storage 192, as the target data, stores: data regarding specific users having a high frequency of detection by the target detector 140, such as the owner of the robot 100, the family member, the acquaintance, or the like; and data regarding a target detected for the first time by the target detector 140.

FIG. 4 illustrates an example of the target data stored in the target data storage region of the target data storage 192. As illustrated in FIG. 4, the target data storage 192 stores in the target data storage region as target data in association with each of the targets identification information (ID), a target type, face image data, the similarity rating, and the favorability rating.

In the target data illustrated in FIG. 4, the face image data is image data acquired by the imager 115a imaging the face of the target. Moreover, the "type" of the target specifically indicates further detailed information such as whether the target is the owner, the family member, the acquaintance, an unknown person (that is, a person being initially met), or the like.

The data of each target in the target data is recorded when the target detector 140 detects the face of each target for the first time. Specifically, in the case in which the face of a particular target is first detected by the target detector 140, that is, in the case in which the face image data of the target detected by the target detector 140 is not recorded in the target data storage 192, the similarity rating calculator 150 calculates the similarity rating between target face and the favorite face, and the favorability rating setter 160 sets the favorability rating on the basis of the similarity rating calculated by the similarity rating calculator 150. The favorability rating setter 160 stores in the target data storage 192 the face image data of the target imaged by the imager 115a in association with the obtained similarity rating and favorability rating.

At this time, the recorded type of the target is set to "unknown" as a default. Therefore, if the recorded target is the "owner", the "family member", or the "acquaintance", the type of the recorded target is revised by the owner or the like of the robot 100 after such recording from "unknown" to "owner", "family member", or "acquaintance".

With reference again to FIG. 3, the condition detector 170 detects the condition of the target present in the surroundings of the robot 100. Here, the "condition of the target" is a present behavior, position, or the like of the target for which the face is detected by the target detector 140, and examples include whether the target is in conversation with someone, how far distant the position of the target is from the robot 100, an amount of time passed since the target and the robot 100 have met, or the like.

The condition detector 170 detects such a present condition of the target in this manner by detection using various types of sensors of the sensor unit 115. For example, the condition detector 170 detects whether the target is in conversation with somebody by detection via the imager 115a or the sound sensor 115b. Moreover, the condition detector 170 uses the distance sensor to detect how far distance the target is from the robot 100. Furthermore, the condition detector 170 determines the length of the period during which the robot 100 and the target have not met from a difference between the present date and time and the date and time when the face of the target is detected last by the target detector 140. The condition detector 170 is achieved by the controller 110 in cooperation with the various types of sensors of the sensor unit 115.

The determiner 180, on the basis of the liking data stored in the liking data storage 191 and the face of the target detected by the target detector 140, determines the operation to be executed by the robot 100. Specifically, the determiner 180 determines the target and the operation to be executed by the robot 100 in accordance with at least one of the following: (1) a peripheral environment of the robot 100, (2) an internal condition of the robot 100, or (3) the target for which the face is detected by the target detector 140. Here, the "peripheral environment" of the robot 100 means an environment of a sound, brightness, air temperature, or the like at the periphery of the robot 100. Moreover, the "internal condition" of the robot 100 means a condition of various types of parameters set for the interior of the robot 100.

Upon the occurrence of a specific event in the peripheral environment of the robot 100, the determiner 180 determines, as the operation to be executed by the robot 100, an operation corresponding to the event that occurred. The "specific event" is an event serving as a trigger for operation of the robot 100, and specific examples correspond to the robot 100 detecting generation of a sudden sound, a change of brightness and/or noise of the surroundings, a human voice, or the like. Here, the robot 100 uses the sound sensor 115b to detect the sudden sound, the human voice, and the noise, and uses imaging by the imager 115a to detect brightness of the surroundings. Upon occurrence of the specific event in the peripheral environment, the determiner 180 determines, as the operation for the robot 100 to be made to execute, an operation such as "moving the ears 103", "locomotion while indicating interest", or the like that is associated beforehand with the event that occurred.

In contrast, in the case in which an internal condition of the robot 100 corresponds to the specific condition, the determiner 180 determines, as the operation to be executed by the robot 100, an operation corresponding to the internal condition. The "specific condition" is a condition serving as a trigger for operation by the robot 100, and this specifically corresponds to a parameter indicating the present emotion of the robot 100 indicating "happiness", "loneliness", "boredom", "sleepiness" or the like. In the case in which the internal condition corresponds to the specific condition, the determiner 180 determines, as the operation to be executed by the robot 100, an operation associated beforehand with the present internal condition of the robot 100, such as "moving about happily", "making a lonely expression", or the like.

Moreover, upon the target detector 140 detecting the face of the target, the determiner 180 determines, as the operation to be executed by the robot 100, the operation corresponding to the target. Specifically, upon the target detector 140 detecting the face of the target, the determiner 180 determines, as the operation to be executed by the robot 100, an operation regarding the detected target, such as "locomotion toward the detected target", "talking to the detected target", or the like, for example.

Here, in the case of establishment of at least two factors among three such factors, that is to say, among (1) occurrence of the specific event in the peripheral environment of the robot 100, (2) the internal condition of the robot 100 corresponding to the specific condition, or (3) sensing of the face of the target by the target detector 140, the determiner 180 determines, as the operation to be executed by the robot 100, one among the operation corresponding to the event that occurred, the operation corresponding to the internal condition, and the operation corresponding to the target. That is to say, in the case in which multiple factors are simultaneously established, the determiner 180 does not determine, as the operation to be executed by the robot 100, all the operations corresponding to the established factors, but rather selects one among such operations in accordance with predetermined rules.

More specifically, in the case in which multiple factors are simultaneously established, the determiner 180 refers to a score table 193 stored in the storage 111, and determines the operation to be executed by the robot 100. The score table 193 is a table that defines a score serving as a standard for the determiner 180 to determine the operation to be executed by the robot 100.

FIG. 5 illustrates an example of the score table 193. As illustrated in FIG. 5, the score table 193 defines respective scores for the factors regarding the peripheral environment of the robot 100, the factor regarding the internal condition of the robot 100, and the factors regarding the target present in the surroundings of the robot 100. The robot 100 executes various types of operations in accordance with such factors, among such multiple factors, occurring at different times. The score defined by the score table 193 is a value indicating degree of priority for determining, from among the multiple factors, a factor of an operation executed by the robot 100.

Firstly, the score table 193 defines, as the score regarding the peripheral environment of the robot 100, a score from 8 points to 15 points. Specifically, as illustrated in FIG. 5, the score table 193 defines, as the score of the factor regarding the peripheral environment, a score differing in reaction to type, such as a score of 15 points upon the robot 100 detecting the sudden sound, a score of 13 points upon detection of a great change in the brightness or the noise of the surroundings of the robot 100 in excess of a standard value, a score of 10 points upon the robot 100 detecting the human voice, and a score of 8 points upon detection of a change in the brightness or noise of the surroundings of the robot 100.

Secondly, the score table 193 defines a score from 1 point to 10 points as a score regarding the internal condition of the robot 100. For example, the score table 193 defines different scores, as the scores of the factors regarding the internal condition, in accordance with parameters indicating the present emotion of the robot 100. The controller 110 causes changes in such parameters indicating the emotion in accordance with the present condition of the robot 100, a present time and/or season, results of interaction with the target, or the like.

Thirdly, the score table 193, as the score regarding the detected target, defines scores that different in accordance with the type of the target stored in the target data storage 192, the present condition of the target detected by the condition detector 170, and the favorability rating with respect to the target stored in the target data storage 192. Specifically, the score regarding the detected target is calculated by adding, to 5 points as factor points: points of a score increasing in order of the "owner", the "family member", the "acquaintance", and "unknown" as the target; points from 0 points to 7 points in accordance with the present condition of the target; and points from 0 points to 3 points in accordance with the favorability rating with respect to the target.

More specifically, although omitted from FIG. 5, the added points regarding the present condition of the target are defined variously in accordance with the present condition of the target detected by the condition detector 170, such as by, for example, addition of 3 points if the target is presently in conversation with someone, addition of 2 points if the target is in front of the eyes of the robot 100, and addition of 2 points when the target meets the robot 100 for the first time in a long time.

Moreover, the added points regarding the favorability rating with respect to the target, are similar to the values of the favorability ratings defined in the target data illustrated in FIG. 4, and are defined by adding from 0 points to 3 points, the added points increasing with increase in the favorability rating. That is to say, the added points with respect to the favorability rating increase with increase in the similarity rating between the face of the target and the favorite face of the robot 100.

In the case in which at least two factors are established among the three factors of the peripheral environment, the internal condition, or the detected target, the determiner 180 refers to the score table 193 configured in this manner, and calculates the score corresponding to the established factors. Then the determiner 180 determines, as the operation to be executed by the robot 100, the operation corresponding to the factor having the highest score.

For example, in the case in which the score that is highest is regarding the peripheral environment, the determiner 180 determines that the operation is "moving the ears 103", "locomotion while indicating interest", or the like. In contrast, when the score regarding the internal condition is highest, the determiner 180 determines that the operation is "make a happy expression", "move about actively", or the like. Moreover, in the case in which the score regarding the detected target is highest, the determiner 180 determines that the operation is "move toward the detected target", "talk to the detected target", or the like. The determiner 180 is achieved by the controller 110 in cooperation with the storage 111.

Further, in the case in which the score regarding the detected target is highest, the determiner 180 determines, as the operation to be executed by the robot 100, an operation that is more favorable with respect to the target with increasing favorability rating with respect to the detected target. For example, in the case in which the favorability rating with respect to the detected target is a first value, in comparison to a case in which the favorability rating with respect to the detected target is a second value smaller than the first value, the determiner 180 determines the operation such that the robot 100 performs locomotion to a position more close to the target, or talks to the target in a more intimate manner.

Moreover, in the case in which the target detector 140 detects multiple target faces in the surroundings of the robot 100, the determiner 180 determines an operation target of the robot 100 from among these multiple targets. Specifically, in the case of detection of multiple targets in the surroundings of the robot 100, the determiner 180 calculates the score in accordance with the score table 193 for each of the multiple targets, and determines, as the operation target of the robot 100, the target having the highest score among the multiple targets. As described above, the score of each target is calculated in accordance with the type of the target, the present condition of the target, and the favorability rating of the robot 100 with respect to the target, and thus the determiner 180 determines, from among the multiple targets, the optimum operation target in response to the multiple indicators that are the type, condition, and favorability rating.

By control of the operation unit 120, the operation controller 130 can cause the robot 100 to execute the operation determined by the determiner 180 in this manner. More specifically, the operation controller 130 causes movement of the movable part 114 by the drive actuator, causes the display 117 to display the image, causes the audio outputter 118 to output audio, or causes movement of the robot 100 by the locomotion actuator. The operation controller 130 by such operation causes the robot 100 to execute the operation determined by the determiner 180, that is, the operation in accordance with the peripheral environment, the internal condition, or the type, condition, and favorability rating of the detected face target.

At this time, when the favorability rating is high with respect to the detected target, that is, when the similarity rating between the face of the detected target and the favorite face of the robot 100 is high, a relatively high score is calculated regarding the target, and thus probability of the selection of an operation with respect to this target is high. Therefore, in the case in which the similarity rating between the face of the detected target and the favorite face of the robot 100 is high, the operation controller 130 causes the robot 100, with high probability, to prioritize execution of the operation with respect to this target. Moreover, in the case in which multiple targets are present in the surroundings of the robot 100, the probability of selection as the operation target increases with increased favorability rating of the target, that is, increases with the degree to which the target has a face having a high similarity rating with the favorite face of the robot 100. Further, the operation controller 130 changes the degree of the favorable operation and the priority operation such that, the higher the favorability rating with respect to the detected target, the greater the degree of the favorable operation and the priority operation with respect to the target.

In this manner, the robot 100 executes the favorable operation and the priority operation with respect to the target having favorite facial features. Due to operation so as to have positive interaction with the specific target in this manner, the robot 100 can be regarded to have individuality in that attraction to the specific target easily occurs.

Processing executed by the robot 100 configured in the aforementioned manner is described with reference to the flowchart illustrated in FIG. 6.

Figure 6:
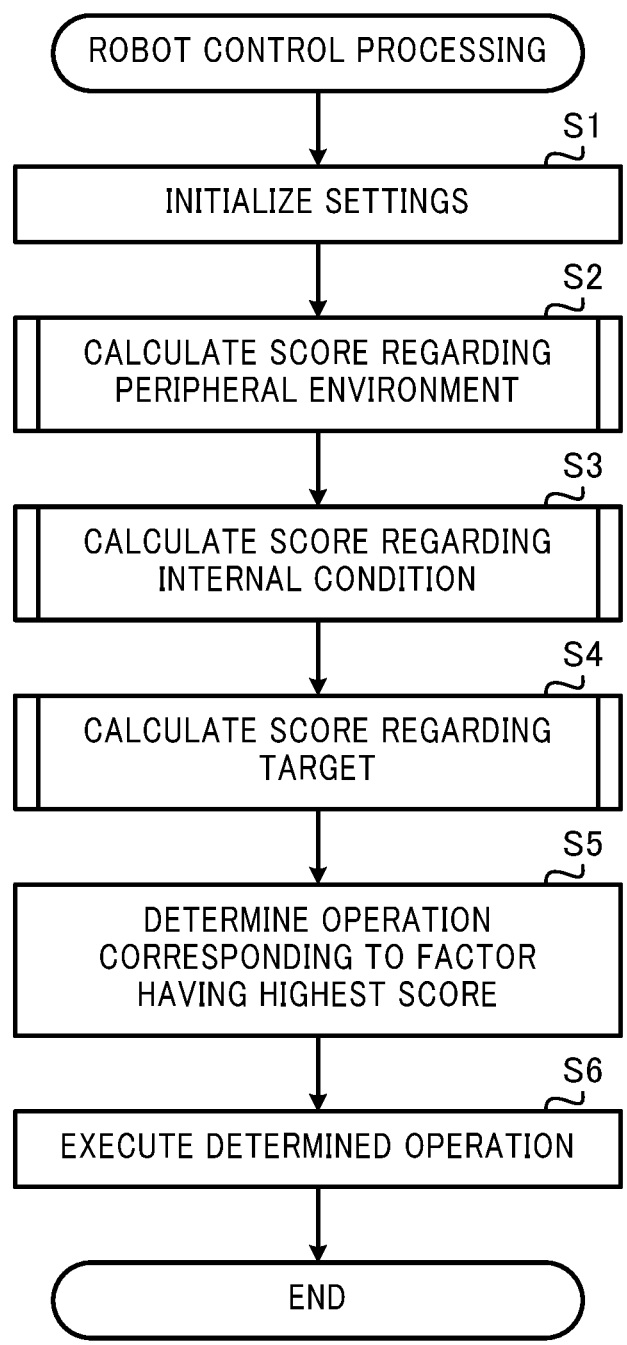
FIG. 6 is a flowchart illustrating robot control processing executed by the robot according to the embodiment of the present disclosure.

The robot control processing illustrated in FIG. 6 begins when the robot 100 enters the normally operable state due to turning ON of electrical power of the robot 100 and charging of the battery 112.

Upon the start of the robot control processing, the controller 110 initializes the various types of settings defined within the robot 100 (step S1). Specifically, the controller 110 clears scores due to factors occurring in the past, by setting to zero the scores regarding each of the peripheral environment, the internal condition, and the detected target.

Upon initialization of the settings, the controller 110 firstly calculates the score regarding the peripheral environment of the robot 100 (step S2). Details of the processing of step S2 are described with reference to the flowchart illustrated in FIG. 7.

Figure 7:
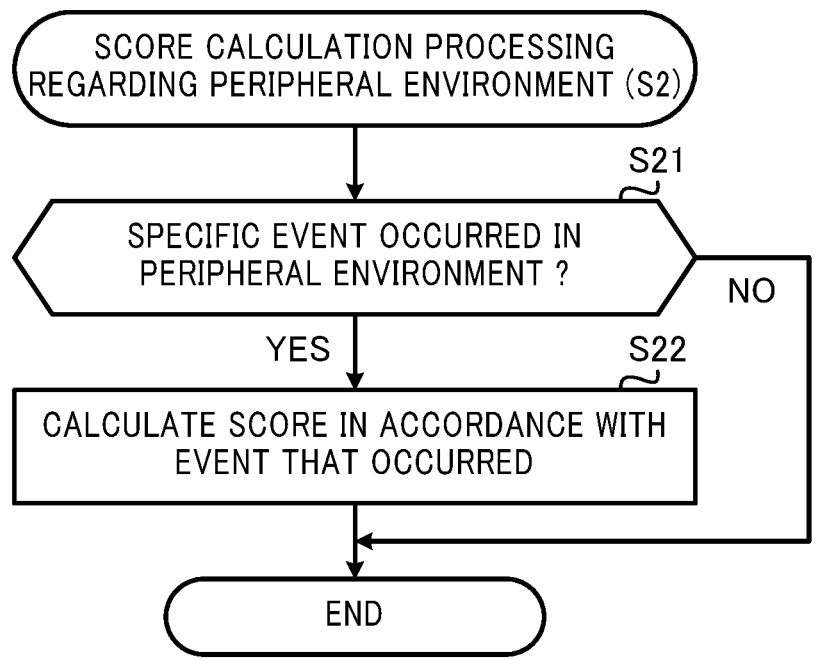
FIG. 7 is a flowchart illustrating score calculation processing regarding a peripheral environment executed by the robot according to the embodiment of the present disclosure.

Upon starting the score calculation processing regarding the peripheral environment illustrated in FIG. 7, the controller 110 determines whether there is, in the peripheral environment of the robot 100, the occurrence of the specific event serving as the trigger for operation by the robot 100 (step S21). Specifically, the controller 110 determines whether there is occurrence, as the specific event, of sensing of an event defined by the score table 193, that is, sensing of the sudden sound, sensing of the change of brightness and/or noise of the surroundings, sensing of the human voice, or the like.

In the case in which any of such specific events has occurred (YES in step S21), the controller 110 calculates the score regarding the peripheral environment in accordance with the event that occurred (step S22). Specifically, the controller 110 refers to the score table 193, and calculates, as the score regarding the peripheral environment, the score from 8 points to 15 points in accordance with the event that occurred.

Further, in the case of the occurrence of multiple events defined in the score table 193, the controller 110 calculates, as the score regarding the peripheral environment, the highest score among the scores of such multiple events.

In contrast, in the case in which the specific event has not occurred (NO in step S21), the controller 110 skips the processing of step S22, and does not calculate the score regarding the peripheral environment. In this case, the controller 110 ends the processing illustrated in FIG. 7 with the score regarding the peripheral environment remaining unchanged at 0.

Again with reference to FIG. 6, secondly, the controller 110 calculates the score regarding the internal condition of the robot 100 (step S3). Details of the processing of step S3 are described with reference to the flowchart illustrated in FIG. 8.

Figure 8:
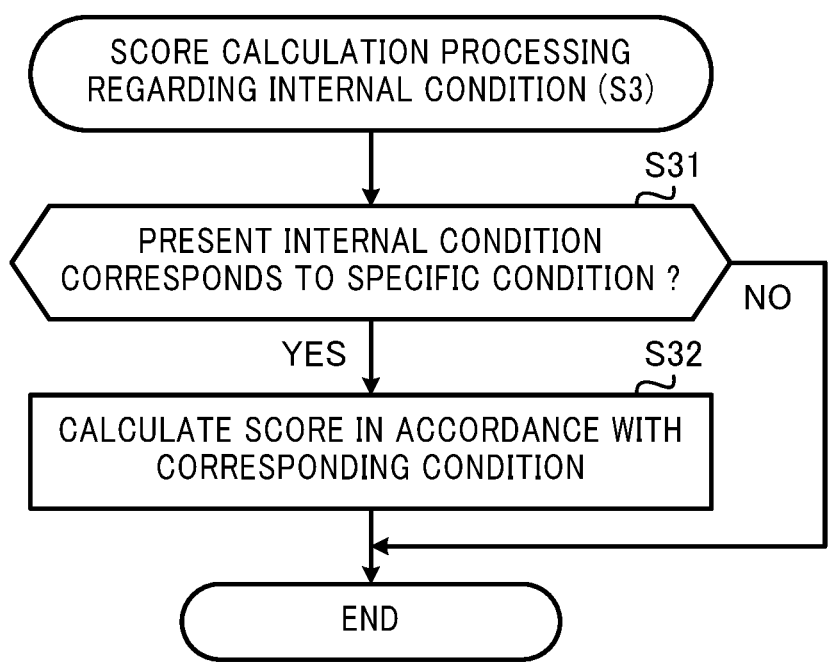
FIG. 8 is a flowchart illustrating score calculation processing regarding an internal condition executed by the robot according to the embodiment of the present disclosure.

Upon starting of the score calculation processing regarding the internal condition illustrated in FIG. 8, the controller 110 determines whether the present internal condition of the robot 100 corresponds to a specific condition serving as a trigger for operation by the robot 100 (step S31). Specifically, the controller 110 determines whether a parameter indicating a present emotion of the robot 100 corresponds to a condition defined in the score table 193, such as "happy", "lonely", "bored", "sleepy", or the like.

In the case in which the internal condition of the robot 100 corresponds to the specific condition (YES in step S31), the controller 110 calculates the score regarding the internal condition in accordance with the corresponding condition (step S32). Specifically, the controller 110 refers to the score table 193 and calculates, as the score regarding the internal condition, the score from 1 point to 10 points in accordance with the corresponding condition.

Further, in the case in which the present internal condition of the robot 100 corresponds to multiple conditions defined in the score table 193, the controller 110 calculates, as the score regarding the internal condition, the highest score among the scores of such multiple conditions.

In contrast, in the case in which the internal condition of the robot 100 does not correspond to the specific condition (NO in step S31), the controller 110 skips the processing of step S32, and does not calculate the score regarding the internal condition. In this case, the controller 110 ends the processing illustrated in FIG. 8 with the score regarding the internal condition remaining at 0.

With reference again to FIG. 6, the controller 110 thirdly calculates the score regarding the target (step S4). Details of the processing of step S4 are described with reference to the flowchart illustrated in FIG. 9.

Upon the start of the score calculation processing illustrated in FIG. 9 regarding the target, the controller 110 functions as the target detector 140 and determines whether the target is detected (step S41). Specifically, the controller 110 determines whether the face of the target is detected within the acquired image by recognition processing, by the image recognizer 119, of the image imaged by the imager 115a.

Upon detection of the target (YES in step S41), the controller 110 determines whether the detected target is recorded beforehand in the target data storage 192 (step S42). Specifically, the controller 110 determines whether facial image data matching the face of the target detected in step S41 is stored beforehand in the target data storage 192. For example, in the case in which the target detected in step S41 is stored beforehand in the target data storage 192 as the "owner", the "family member", the "acquaintance", or the like, the controller 110 determines that the detected target is previously recorded.

In the case in which the detected target is not recorded beforehand in the target data storage 192 (NO in step S42), the controller 110 functions as the similarity rating calculator 150 and calculates the similarity rating between the face of the detected target and the favorite face of the robot 100 stored in the liking data storage 191 (step S43). Specifically, the controller 110 performs a comparison of outlines and facial parts of the face of the detected target with the favorite face, and calculates the degree of resemblance of the two faces with each other in accordance with predetermined rules.

Upon calculation of the similarity rating, the controller 110, functioning as the favorability rating setter 160, sets the favorability rating concerning the detected target (step S44). Specifically, the higher the similarity rating between the face of the detected target and the favorite face, the higher the controller 110 sets the favorability rating with respect to the target.

Upon setting the favorability rating, the controller 110 updates the target data storage 192 (step S45). Specifically, the controller 110 causes storage, in the target data storage 192, of the facial image data of the target detected in step S41, the similarity rating calculated in step S43, and the favorability rating set in step S44 in association with each other.

In contrast, in the case in which the detected target is recorded beforehand in the target data storage 192 (YES in step S42), the facial image data, the similarity rating, and the favorability rating of the detected target are previously recorded in the data storage 192. The controller 110 in this case therefore skips the processing from step S43 to step S45.

Next, the controller 110, functioning as the condition detector 170, detects the present condition of the detected target (step S46). Specifically, via the sensor unit 115 such as the imager 115a, the sound sensor 115b, and the distance sensor, the controller 110 makes determinations such as whether the detected target is in conversation with someone, distance between the detected target and the robot 100, and whether the detected target is met for the first time in a long time.

Upon detection of the condition of the target, the controller 110 calculates the score regarding the target (step S47). Specifically, the controller 110 refers to the score table 193, and calculates the score regarding the target by adding, to the 5 points that are the factor score with respect to the detected target, each of the scores in accordance with the type of the detected target, the condition of the detected target, and the favorability rating concerning the detected target.

Further, in the case in which multiple targets are detected in step S41, the controller 110 executes the processing from step S42 to step S47 for each of the multiple detected targets, and calculates the respective score. Then the controller 110 calculates, as the score regarding the target, the score that is highest among the scores calculated for each of the multiple targets.

However, in the case in which no target is detected in step S41 (NO in step S41), the controller 110 skips the processing from step S42 to step S47, and does not calculate the score regarding the target. In this case, the controller 110 ends the processing illustrated in FIG. 9 with the score regarding the target remaining at 0.

Further, the controller 110 may omit the processing of referencing and updating of the target data storage 192 occurring in steps S42 and S45 in FIG. 9. Specifically, in the case in which the target is detected in step S41, the controller 110, without determining whether the detected target is recorded previously in the target data storage 192, executes the processing of steps S43 and S44, and sets the favorability rating with respect to the detected target. Then the controller 110 skips the processing that updates the target data storage 192 in step S45, and executes the processing of steps S46 and S47. In this manner, each time the target is detected, the controller 110 can set sequentially the favorability rating with respect to the target, and can also calculate the score regarding the detected target.

With reference again to FIG. 6, upon calculating the score regarding each of the factors in this manner, the controller 110 functions as the determiner 180 and determines the operation that is associated with the factor having the highest score (step S5). For example, in the case in which the score regarding the peripheral environment is highest, the controller 110 determines, as the operation to be executed by the robot 100, an operation associated beforehand with the event that occurred in the peripheral environment. In contrast, in the case in which the score regarding the internal condition is highest, the controller 110 determines, as the operation to be executed by the robot 100, an operation associated beforehand with the corresponding condition. Moreover, in the case in which the score regarding the detected target is highest, the controller 110 refers to the score table 193 illustrated in FIG. 5, and determines, as the operation to be executed by the robot 100, an operation in accordance with the type and condition of the detected target, and the favorability rating of the robot 100 concerning the detected target. At this time, in the case in which the favorability rating with respect to the detected target is high, the controller 110 determines, as the operation to be executed by the robot 100, a further favorable operation or priority operation. Moreover, in the case in which multiple detected targets coexist, the controller 110 determines, as the operation target, the target for which the score is highest among the multiple targets.

Upon determination of the operation, the controller 110, functioning as the operation controller 130, causes the robot 100 to execute the determined operation (step S6). Specifically, the controller 110 causes the robot 100 to execute the operation corresponding to the factor having the highest score, by causing movement of the movable part 114, causing display of the image on the display 117, causing the audio outputter 118 to output audio from the audio speaker, or causing locomotion of the robot 100.

Upon execution of the operation by the robot 100 in this manner, the controller 110 ends the processing illustrated in FIG. 6. As long as the robot 100 is running normally, the controller 110 repeatedly executes the processing illustrated in FIG. 6 as needed. Due to such operation, the controller 110 causes the robot 100 to perform various types of operations in accordance with the multiple factors.

As described above, the robot 100 according to the present embodiment has the liking data storage 191 in which is stored the liking data indicating the faces for which the robot 100 has preferences, and executes operations that differ in accordance with the similarity rating between the face of the detected target and the faces of the preferences of the robot 100 indicated by the liking data. By this means, the operations of the robot 100 can be made to have individuality.

In particular, multiple robots of the same type, due to acting in accordance with the same algorithm, basically result in performance of the same operation under the same conditions. Thus, although some differences can arise in the operations of each robot according to factors such as operational history, the possession of individuality in the operations of each unit is fundamentally difficult. In contrast, in accordance with the robot 100 according to the present embodiment, the possessed liking data differs among robots even when the model type is the same, and the liking data is set so as to be incapable of updating and deletion later by the user. Due to such configuration, the operations of the robot 100 can be conferred individuality in accordance with innate preferences, as if having the individuality with which humans are born. As a result, due to the arising of differences of individuality in treatment by the robot 100 with respect to multiple targets, affinity with respect to the robot 100 can be made easier.

Modified Examples

Although an embodiment of the present disclosure is described above, the aforementioned embodiment is an example, and the scope of the present disclosure is not limited by this embodiment. That is, various types of applications are possible for the embodiments of the present disclosure, and all such embodiments are included in the scope of the present disclosure.

For example, in the aforementioned embodiment, the liking data indicating the favorite face of the robot 100 is stored beforehand in the liking data storage 191 prior to shipment of the robot 100. However, in the present disclosure, such configuration is not limiting, and as long as the user is unable to freely set the liking data, storage in the liking data storage 191 may be performed even after shipment.

For example, upon initial startup of the robot 100 after shipment, the robot 100 may acquire, and store in the liking data storage 191, the liking data from a server external to the robot 100 via a wireless communication unit 116. In this case, the external server has beforehand, as the liking data, multiple sets of image data indicating faces that are different from each other. Upon initial connection to the network after shipment, the robot 100 requests the liking data from the external server. In accordance with the request from the robot 100, the external server transmits to the robot 100 at least a single set of image data selected, randomly or in accordance with prescribed rules, from among multiple sets of image data.

Alternatively, after shipment of the robot 100, the robot 100 may store in the liking data storage 191 as the liking data the data indicating the face detected initially by the target detector 140. Specifically, after the user purchases the robot 100, upon initial activation, the robot 100 starts imaging by the imager 115a. Then in the case in which a human face is included in the acquired image, the robot 100 uses the target detector 140 to detect the face. At this time, if the face detected initially by the robot 100 is the face of the user, then the face of the user is set as the favorite face of the robot 100. Alternatively, if the face initially detected by the robot 100 is that of a human other than the user, the face of the other human is set as the favorite face of the robot 100. Due to configuration in this manner, the individuality of the robot 100 can be set as if due to imprinting.

In the aforementioned embodiment, the liking data storage 191 stores, as the liking data, the data indicating the facial preferences of the robot 100. However, the present disclosure is not limited to faces as the liking data, and the liking data storage 191 may store data indicating audio preferences of the robot 100.

In this case, the target detector 140 detects the audio of the target present in the surroundings of the robot 100 via the sound sensor 115b. The similarity rating calculator 150 calculates the similarity rating between the audio of the target detected by the target detector 140 and the favorite audio of the robot 100 indicated by the liking data stored in the liking data storage 191. Specifically, the robot 100 is equipped with an audio recognition unit that performs audio recognition by analysis of waveforms, frequencies, or the like of the audio; and the similarity rating calculator 150, using the audio recognition unit, compares waveforms, frequencies, or the like of the target audio with the favorite audio of the robot 100. By such operation, the similarity rating calculator 150 calculates the similarity rating of the two audio patterns. In the case in which the similarity rating of the two types of audio is rather high, the favorability rating setter 160 sets the favorability rating with respect to the target high. Due to such operation, the robot 100 can be made to act favorably and preferentially with respect to the target that generates the favorite audio of the robot 100.

At this time, in the same manner as the determination of the favorite face by the effect of imprinting, the favorite audio may be determined to be the audio initially heard by the robot 100. That is to say, after shipment of the robot 100, the robot 100 may store as the liking data in the liking data storage 191 the data indicating the audio of the target detected initially by the target detector 140.

In the aforementioned embodiment, an example is described of the face as having the external appearance that is the favorite of the robot 100 as indicated by the liking data. However, in the present disclosure, the external appearance is not limited to the face, and for example, may be that of the overall body, or that of a non-facial part. For example, in the case in which the robot 100 is set to execute the favorable operation concerning a dog or a cat, the liking data storage 191 may store, as the liking data indicating the favorite external appearance of the robot 100, data indicating that of the overall body of the dog or the cat.

In the aforementioned embodiment and the aforementioned modified embodiment, although examples are described using the favorite external appearance or favorite audio as the liking data of the robot 100, an external appearance or audio disliked by the robot 100 may be used as the liking data. In the case in which the external appearance or the audio disliked by the robot 100 is used as the liking data, the robot 100 does not act favorably toward the target having the disliked external appearance or audio.

For example, external appearance of a living being having many legs such as a spider or a centipede, a living being lacking legs such as a snake or a worm (that is to say, a living being in which legs are not imaged in the acquired image), a generally small living being such as an insect, or the like may be stored in the liking data storage 191 as the liking data indicating external appearances disliked by the robot 100. In the case in which liking data is stored in the liking data storage 191 indicating the external appearance or audio disliked by the robot 100, the similarity rating calculator 150 calculates the similarity rating between the external appearance or audio of the target detected by the target detector 140 and the external appearance or audio of the target disliked by the robot 100 and indicated by the liking data stored in the liking data storage 191. The higher the similarity rating calculated by the similarity rating calculator 150, the lower the favorability rating setter 160 sets the favorability rating of the robot 100 with respect to the target.

Moreover, the liking data storage 191 is not limited to external appearance or audio as the liking data, and data may be also stored that indicates preferences of the robot 100 regarding actions or behavior. The robot 100 detects the operations or behavior of the certain target by using the imager 115a to acquire a video image of the certain target. For example, the liking data storage 191 may store template data of a video image indicating a masculine or feminine behavior as the liking data indicating the behavior disliked by the robot 100. In this case, when the target detector 140 detects that the behavior of the user is feminine despite the user being detected to be masculine, the favorability rating setter 160 sets the favorability rating concerning the user lower than in the case in which the behavior of the user is not feminine.

Alternatively, the liking data storage 191 may store data, as the liking data, indicating preferences of the robot 100 regarding attributes. The certain target attribute is expressed by phraseology of the certain target, treatment with respect to the robot 100 by the certain target, or the like. The robot 100 uses the sound sensor 115b to detect audio generated by the certain target, analyzes the detected audio using a technique such as audio recognition, and thus determines whether the phraseology of the certain target is rude/polite, masculine/feminine, or the like. Moreover, by using the touch sensor 115c to detect strength of touch of the robot 100 by the certain target, the robot 100 determines whether the treatment with respect to the robot 100 by the certain target is rowdy, gentle, or the like. In one example, the liking data storage 191 may store, as the liking data indicating the favorite attribute of the robot 100, template data indicating that phraseology is polite, or that the treatment with respect to the robot 100 is gentle. Moreover, the liking data storage 191 may store, as the liking data indicating the disliked attribute of the robot 100, template data indicating that phraseology is rough, or that the treatment with respect to the robot 100 is rowdy.

The liking data indicating preferences of the robot 100 regarding the actions, the behavior, or the attributes in this manner is data to cause the robot 100 to have individuality in the same manner as the liking data indicating the aforementioned the preferences of the robot 100 regarding external appearance or audio. Therefore, the liking data indicating preferences of the robot 100 regarding the actions, behavior, or attributes is set so as to be incapable of change and deletion by the user, and so that differences occur between multiple robots of the same model type In the aforementioned embodiment, the operation controller 130 causes the robot 100 to execute the operation in accordance with the type and condition of the detected target, and the favorability rating of the robot 100 with respect to the detected target. However, in the present disclosure, (i) a first operation that is an operation in accordance with the favorability rating of the robot 100 with respect to the detected target, and (ii) a second operation that is an operation in accordance with the type or condition of the detected target, may be determined separately from each other; and the operation controller 130 may cause the robot 100 to execute the first operation, and the second operation different from the first operation, in order, simultaneously, or selectively.

Specifically, in the case in which the robot 100 is made to execute the first operation and the second operation in order, the operation controller 130 may randomly determine the order of execution of the operations by the robot 100, or may determine the order of execution on the basis of execution history of each operation. In the case in which the robot 100 is made to execute the first operation and the second operation simultaneously, the operation controller 130 may cause the robot 100 to execute the first operation by causing operation of a portion of components from among the head 101, the ears 103, the paws 107, and the legs 108 included in the movable part 114, and may cause the robot 100 to execute the second operation by causing operation of another part. Alternatively, in the case in which the robot 100 is made to simultaneously execute the first operation and the second operation, the operation controller 130 may cause the robot 100 to execute the first operation by using some part from among the movable part 114, the display 117, and the audio outputter 118 included in the operation unit 120; and may cause the robot 100 to execute the second operation by using the other parts. Alternatively, in the case in which the robot 100 is made to selectively execute the first operation and the second operation, the operation controller 130 may randomly select the operation to be executed by the robot 100, and the selection may be on the basis of execution history of each operation.

In the aforementioned embodiment, the robot 100 is fashioned after a dog. However, the robot 100 according to the present disclosure may have any shape. For example, the robot 100 according to the present disclosure may be fashioned to have the external appearance of another animal, such as a cat, mouse, or rabbit; and may be fashioned after a human.

In the aforementioned embodiment, the eyes 104 are equipped with displays 117, and the mouth 105 is equipped with the imager 115a. However, in the present disclosure, the displays 117 may be arranged at a location other than the eyes 104, and the imager 115a may be arranged at a location other than the mouth 105, such as the nose.

In the aforementioned embodiment, the controller 110 functions as each component illustrated in FIG. 3 by the CPU executing programs stored in the ROM. However, in the present disclosure, the controller 110 may be equipped with dedicated hardware, in place of the CPU, such as an application specific integrated circuit (ASIC), a field-programmable gate array (FPGA), or various types of control circuits, and the dedicated hardware may function as each of the components illustrated in FIG. 3. In this case, each of the functions of the components may be executed by separate hardware units, or a single hardware unit may collectively achieve the functions of each of the components. Moreover, a portion of the functions of the components may be achieved by dedicated hardware, and the other portion may be achieved by software or hardware. Further, the main units for executing each of the functions including the CPU and such dedicated hardware may be collectively referred to as the "processor".

Further, by use of a program, a previously existing information processing device or the like can be made to function as the robot according to the present disclosure, by being able to provide beforehand to the device, as the robot, the configuration for achieving the functions according to the present disclosure. That is, a program to achieve the functional configuration of the robot 100 described in the aforementioned embodiment can be suitably executed by the CPU or the like controlling an existing information processing device or the like, and thus such a program can cause the existing information processing device or the like to function as the robot according to the present disclosure.

Moreover, the method of use of such a program may be freely selected. The program may be used by storage on a computer-readable recording medium such as a flexible disc, a compact disc (CD)-ROM, a digital versatile disc (DVD)-ROM, a memory card, or the like, for example. Furthermore, the program may be superimposed on a carrier wave, and may be used via a communication medium such as the Internet. For example, the program may be posted on, and distributed from, a bulletin board system (BBS) on a communication network. Further, a configuration may be used such that the aforementioned processing can be executed by starting and executing the program under control of an operating system (OS) in the same manner as other application programs.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A robot comprising:
a sensor configured to detect external appearance or audio of a living being;
a memory configured to store, prior to shipping of the robot, individuality data relating to external appearance or audio of a living being, the individuality data being different from data that is used for authenticating the living being of which the external appearance or the audio is detected by the sensor; and
a processor configured to
calculate a similarity rating between (i) the individuality data stored in the memory and (ii) the external appearance or the audio of the living being detected by the sensor, and
by controlling the robot, cause the robot to execute an operation in accordance with the calculated similarity rating.

2. The robot according to claim 1, wherein
the higher the calculated similarity rating, the higher the processor sets a favorability rating of the robot with respect to the living being, and
the processor controls the robot to cause the robot to execute the operation in accordance with the set favorability rating.

3. The robot according to claim 2, wherein
the processor, by controlling the robot, causes the robot to execute the operation in accordance with (i) a condition of the living being, and (ii) the set favorability rating of the robot with respect to the living being.

4. The robot according to claim 1, wherein
the processor
determines the operation based on the individuality data and the detected external appearance or audio of the living being, and
by controlling the robot, causes the robot to execute the determined operation.

5. The robot according to claim 4, wherein
the processor determines the operation to be executed by the robot in accordance with at least one of: (i) a peripheral environment of the robot, (ii) an internal condition of the robot, or (iii) the living being for which the external appearance or audio is detected.

6. The robot according to claim 5, wherein
upon a specific event occurring in the peripheral environment, the processor determines an operation corresponding to the specific event that occurred, as the operation to be executed by the robot,
upon the internal condition corresponding to a specific internal condition, the processor determines an operation corresponding to the specific internal condition, as the operation to be executed by the robot, and upon detection of the external appearance or audio of the living being, the processor determines an operation corresponding to the living being, as the operation to be executed by the robot.

7. The robot according to claim 6, wherein upon occurrence of at least two of (i) the specific event in the peripheral environment, (ii) the internal condition corresponding to the specific internal condition, or (iii) detection of the external appearance or audio of the living being, the processor, based on the individuality data and the external appearance or audio of the living being, determines, as the operation to be executed by the robot, one among (i) an operation corresponding to the event that occurred, (ii) an operation corresponding to the internal condition, and (iii) an operation corresponding to the living being.

8. The robot according to claim 4, wherein upon detection of the external appearance or audio of a plurality of the living beings, the processor determines the living being, serving as an operation target of the robot, from among the plurality of living beings based on (i) the detected external appearance or audio of the plurality of living beings and (ii) the individuality data, and by control of the robot, the processor causes the robot to execute the determined operation with respect to the determined living being.

9. The robot according to claim 1, wherein preferences of the robot regarding the external appearance or audio indicated by the individuality data differ from preferences of external appearance or audio of another robot indicated by another individuality data stored in the another robot, the another robot being of a same model type as the robot.

10. The robot according to claim 1, wherein the robot further comprises at least one of
　a drive actuator configured to drive a movable part,
　a display,
　an audio speaker, or
　a locomotion actuator configured to cause locomotion of the robot, and by using the drive actuator to drive the movable part, causing an image to display on the display, causing output of audio from the audio speaker, or causing locomotion of the robot by the locomotion actuator, the processor causes the robot to execute the operation in accordance with (i) the individuality data and (ii) the detected external appearance or audio of the detected living being.

11. The robot according to claim 1, wherein the individuality data is stored in a individuality data storage region of the memory that differs from a target data storage region of the memory in which is stored target data regarding specific users including an owner of the robot, and the specific users cannot change or delete the individuality data.

12. The robot according to claim 1, wherein by control of the robot, the processor causes the robot to execute (i) a first operation that is the operation in accordance with the individuality data and the detected external appearance or audio of the living being, and (ii) a second operation in accordance with a type of the living being, the second operation being different from the first operation.

13. The robot according to claim 1, wherein by control of the robot, the processor causes the robot to execute, as the operation, an operation in accordance with (i) the individuality data, (ii) the external appearance or audio of the detected living being, and (iii) a type of the living being.

14. The robot according to claim 1, wherein the operation is a favorable operation and a priority operation with respect to the living being, and the processor, in accordance with the calculated similarity rating, changes a degree of the favorable operation and the priority operation with respect to the living being.

15. A non-transitory computer-readable recording medium for a robot having a sensor configured to detect external appearance or audio of a living being and memory configured to store, prior to shipping of the robot, individuality data relating to external appearance or audio of a living being, the individuality data being different from data that is used for authenticating the living being of which the external appearance or the audio is detected by the sensor, the non-transitory computer-readable recording medium storing a program that, when executed by a processor, causes the processor of the robot to:

calculate a similarity rating between (i) the individuality data stored in the memory and (ii) the external appearance or the audio of the living being detected by the sensor, and by controlling the robot, cause the robot to execute an operation in accordance with the calculated similarity rating.

16. A robot comprising:

a sensor configured to detect an external stimulus that acts on the robot;
　a memory configured to store individuality data; and
　a processor configured to
　　compare (i) the individuality data stored in the memory and (ii) the external stimulus detected by the sensor, and
　　by controlling the robot, cause the robot to execute an operation in accordance with a compared result.

\* \* \* \* \*